Sept. 3, 1963  H. W. BIGGE  3,102,735
STEERABLE TRAILER

Filed Feb. 24, 1961  4 Sheets-Sheet 1

INVENTOR.
HENRY W. BIGGE
BY
*[signature]*
ATTORNEY

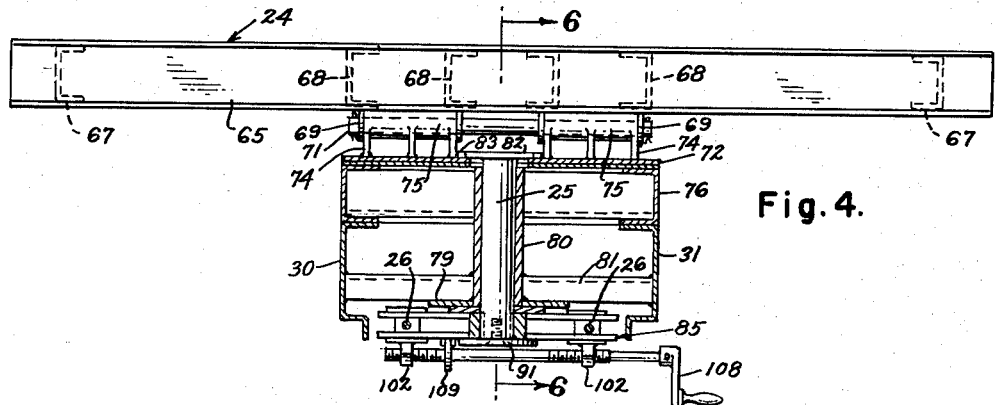
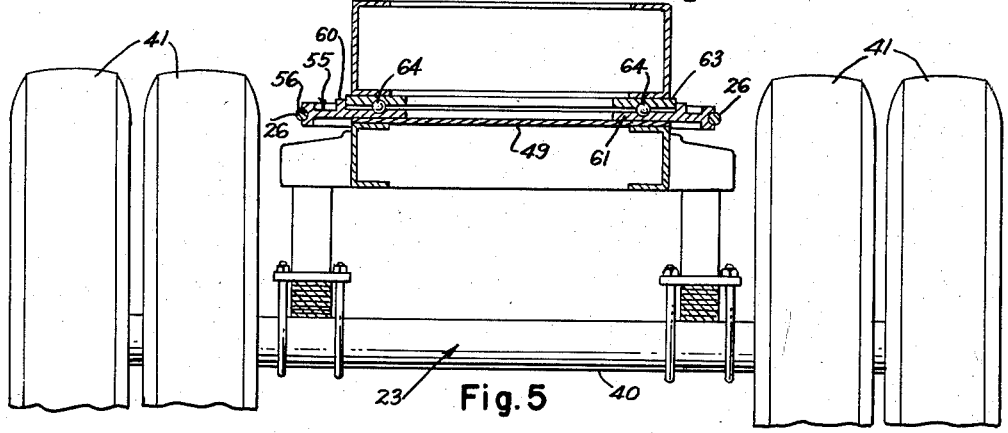
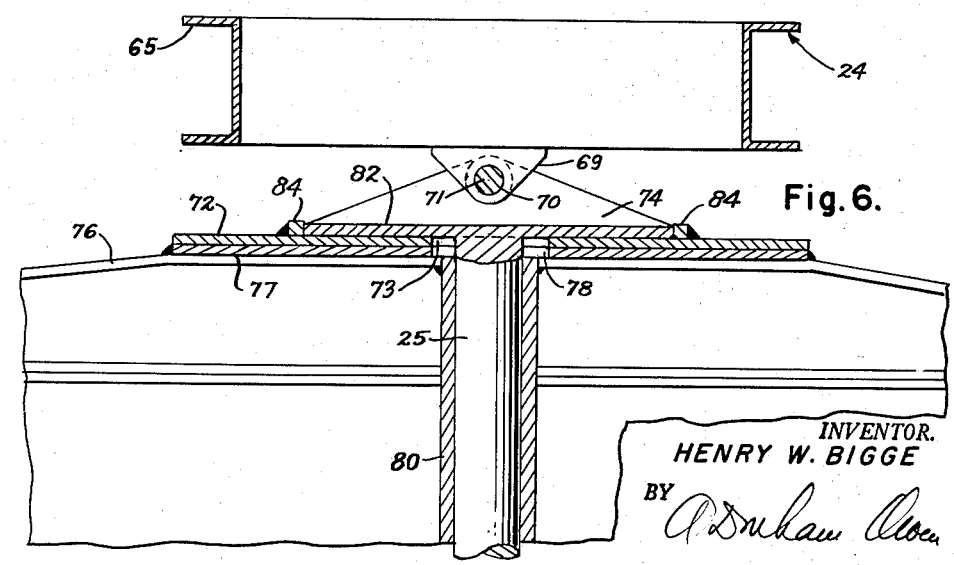

Sept. 3, 1963      H. W. BIGGE      3,102,735
STEERABLE TRAILER

Filed Feb. 24, 1961      4 Sheets-Sheet 3

INVENTOR.
HENRY W. BIGGE
BY
ATTORNEY.

Sept. 3, 1963    H. W. BIGGE    3,102,735
STEERABLE TRAILER
Filed Feb. 24, 1961    4 Sheets-Sheet 4
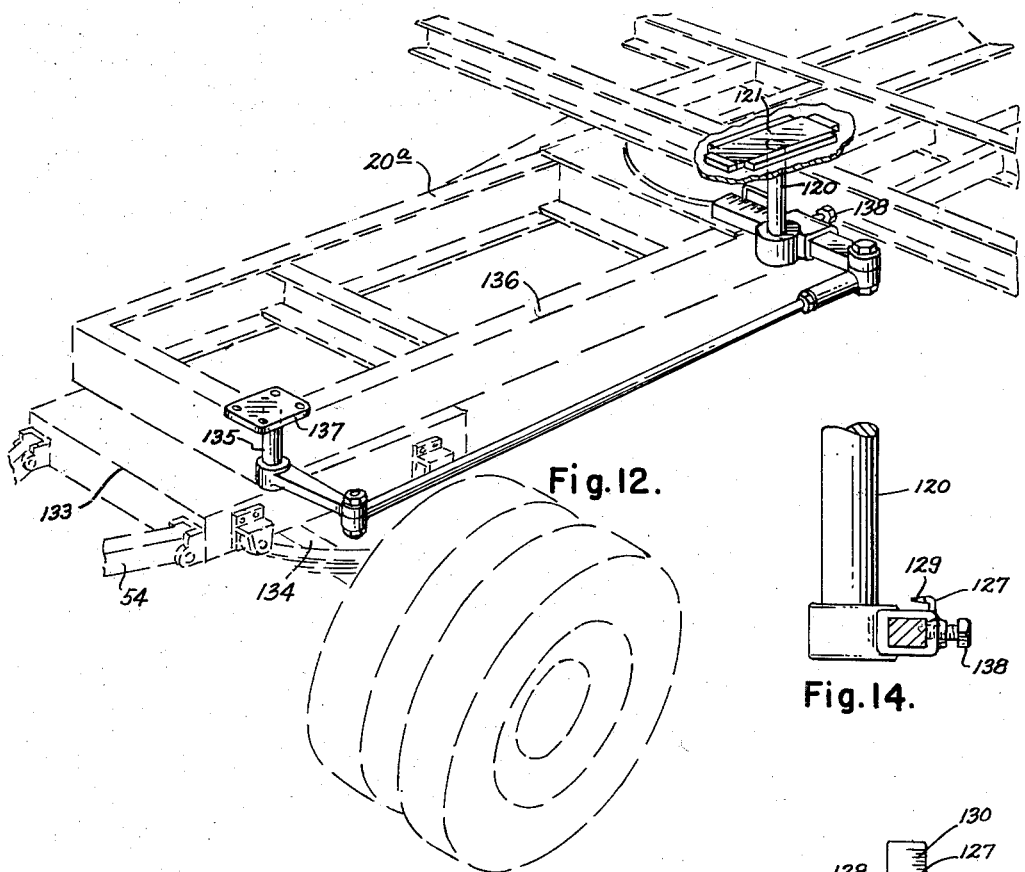
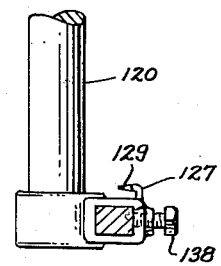
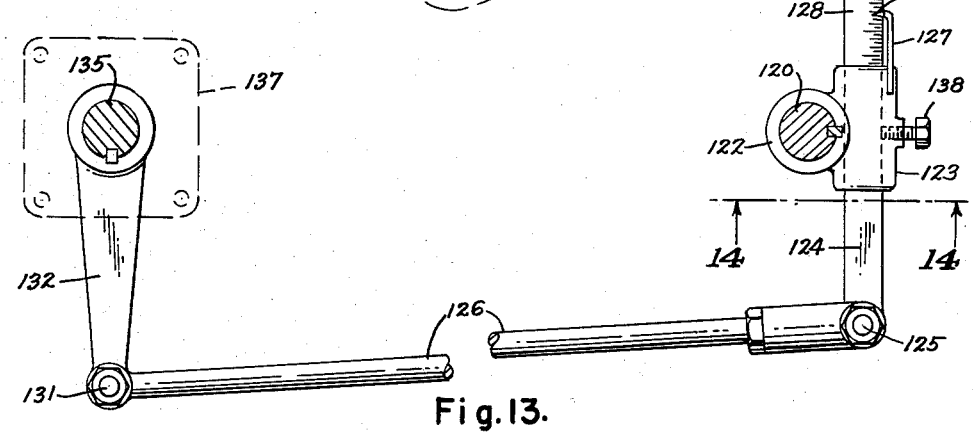
INVENTOR.
HENRY W. BIGGE
BY
ATTORNEY.

3,102,735
STEERABLE TRAILER
Henry W. Bigge, 50 Marsh Place, Oakland, Calif.
Filed Feb. 24, 1961, Ser. No. 91,470
6 Claims. (Cl. 280—81)

This invention relates to trailers of the type used with a tractor truck vehicle for hauling long heavy loads. More particularly, it relates to an automatic steering device for such vehicular trailers which will enable the trailer to track directly in the path of a tractor during all turning maneuvers.

A non-steerable trailer, bogie or dolly drawn by a tractor vehicle will not follow directly behind the tractor during turns, but will progressively turn inside the tractor vehicle. This inherent characteristic of non-steerable trailers heretofore presented a particularly serious problem where it was necessary to haul long loads over roads or highways with limited width. In some instances such width limitations are due to the actual road bed measurements, and in other instances the limitation is imposed by local transport regulations. In the prior art, various forms of manually controlled trailers were devised to solve the trailer steering problem. Also, some efforts were made to provide an automatic trailer steering mechanism, but these resulted in highly complicated mechanical systems, all of which failed to provide a practical solution to the problem.

Basically, the problem was that of providing a means for steering a trailer carrying a long load in combination with a tractor by automatically turning the wheels of the trailer an amount exactly proportional to the degree of turn being made by the tractor vehicle, so that the trailer would track directly in the path of the tractor. To assure effective operation of the trailer, the response of the trailer steering means to the turning of the tractor must be immediate and accurate. No lag in reaction nor slippage of linkage components can be tolerated. Also it is necessary that the steering system be as simplified as possible so that the initial cost and the subsequent maintenance of the steering system will be at a minimum.

The trailer steering problem, including all of the aforementioned aspects, has been solved by my invention which comprises a novel linkage actuated by a central shaft attached to a fifth wheel or load bed and mounted vertically within the trailer frame. The trailer load bed is connected by a rigid reach or by a load member itself to a fifth wheel of the tractor vehicle, so that when the tractor turns the trailer load bed and the central vertical shaft will rotate in amount directly proportional to the amount of turning of the tractor. The trailer shaft is linked by a novel means to the front axle assembly of the trailer and thus the shaft rotation causes a proportional amount of rotation of a movable axle assembly relative to the trailer frame to steer the trailer the exact amount necessary to cause it to track directly behind the tractor. In contrast to the complicated prior art devices, my novel steering device has a minimum of interconnecting links and complicated components and is readily adaptable to most standard trailer configurations. The linkage is arranged so that it can be easily serviced and adjusted for any misalignment of the fifth wheel relative to the axle assembly.

Another problem in providing practical and versatile automatic steering device for a trailer was that of providing a means to very rapidly and accurately adjust the turning rate of the trailer to compensate for a change in the distance between the tractor and trailer. This distance between the tractor and trailer will vary considerably during wide use of the trailer depending on the length of the load being carried. For an increased distance between the fifth wheel of the trailer and tractor, the amount of turning of the trailer axle relative to the amount of turning of the tractor must be decreased in order for the trailer to continue to track exactly in the path of the tractor vehicle. My invention provides a means for quickly and accurately changing the lever arm ratio between the fifth wheel of the trailer and its axle assembly for different load-lengths by merely turning a crank handle attached to the linkage. Thus, this linkage adjustment can be made by the truck driver whenever necessary without the loss of time and without the need for special tools and shop facilities.

Another problem that has been solved by my novel trailer steering device is the elimination of damage to the steering linkage or any irregular or erratic steering movements of the trailer steering axle due to inadvertent shock or heavy vibration which often occurs when hauling heavy loads over rough roads. The present invention provides for a linkage system having means in the connecting linkage between the trailer load bed and steering axle assembly to absorb any shock that occurs as the trailer is moving, including all turning maneuvers. Thus, any short amplitude jolting or vibratory movement of the load will be absorbed in the linkage system and the axle assembly will remain steady, providing smooth firm directional control.

As mentioned previously, my novel trailer steering system can be utilized by securing a rigid load member at one end to the fifth wheel of a trailer and at the other end to the fifth wheel of a truck. However, under most circumstances it is preferable to provide a fixed reach connection between the fifth wheels of the truck and trailer so that when the trailer is being drawn without a load, the steering function is still effective and the trailer load bed will not be free to rotate uncontrollably. A reach connection is also preferable to facilitate the maneuvering of the truck and trailer during the loading operation.

In summarizing, some of the major objects of the present invention are: (1) to provide means for automatically steering a trailer attached to a tractor vehicle, so that the trailer will follow directly in the path of the tractor during turns; (2) to provide a trailer having a steerable axle that is movable in response to movemnt of the load on the trailer; (3) to provide a linkage system connected between a vertical shaft mounted on a trailer frame and an axle assembly on the trailer frame that is capable of absorbing sudden movements of the load bed or the axle assembly; (4) to provide an automatic steering device for a trailer that is easily adjustable to accommodate a change in the distance between the tractor and the trailer load bed; and (5) to provide automatic steering system for a trailer having a rigid extendable reach connection between the fifth wheels or load beds of the trailer and the tractor.

Another object of the invention is to provide a steerable trailer that will have positive directional control when either backing up or going forward.

Another object is to provide, on a trailer drawn by a tractor vehicle, an automatic steering control mechanism that is inexpensive to manufacture and easy to maintain.

The invention is characterized by having the load bed or bolster of the trailer rotatably mounted on the trailer frame by means of a vertical shaft connected to the load bed. The frame in turn is supported on one or more axles and a novel linkage mechanism is connected to and extends from the vertical load bed shaft to provide for rotation of one of said axles about a vertical axis relative to the frame in response to rotation of the load bed relative to the frame.

Other objects and advantages and important features of the present invention will become apparent during the course of the following description, references being had therein to the accompanying drawings, in which:

FIG. 4 is a view in section taken along line 4—4 of FIG. 1 and showing the load bed linkage;

FIG. 5 is a view in section taken along line 5—5 of FIG. 1 and showing the linkage connection on the movable axle;

FIG. 6 is a view in section taken along line 6—6 of FIG. 4, showing the connection between the pivotal shaft and the load bed in detail;

FIG. 12 is a fragmentary view in perspective showing an alternate form of linkage connection between the load bed and the movable axle, the other trailer components are shown in phantom;

FIG. 13 is a fragmentary plan view of the alternate form of linkage connection as shown in FIG. 12;

FIG. 14 is an enlarged fragmentary view in elevation and section taken along line 14—14 of FIG. 13.

Although the present invention will be described with respect to a particular vehicular trailer configuration, it is to be understood that the principles of my novel automatic steering apparatus can be applied to various trailer type vehicles equipped with at least one pair of steerable wheels to provide automatic steering for the trailer when it is drawn by a tractor or truck.

Figure 1:
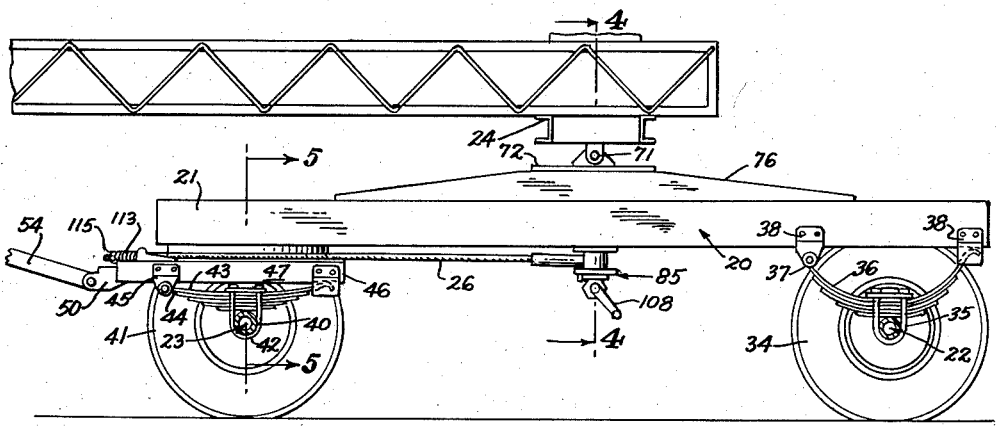
FIG. 1 is a view in elevation of a trailer having a front movable axle and showing one embodiment of the steering mechanism according to the principles of the present invention.

In FIG. 1 an automatic steering device, according to the principles of the invention, is shown installed on a trailer 20 having a frame 21 with a fixed rear axle 22 and a front axle 23 which is rotatable in a horizontal plane parallel to the frame 21. Mounted on the frame 21 between the fixed and movable axles 22 and 23 respectively, is a load bed 24 or a similar device such as a bolster or fifth wheel which is connected to a central pivotal shaft 25 mounted in a vertical position on the trailer frame perpendicular to the plane of rotation of the load bed 24. At the lower end of the shaft 25 and connected thereto is a novel adjustable linkage assembly including a pair of cables 26 shown in the embodiment of FIGS. 1–11. The cables 26 link together the shaft 25, attached to the rotatable load bed 24, and the movable front axle 23. Thus, when the trailer 20 is used in combination with a tractor vehicle having a suitable form of a rotatable load bed or fifth wheel the tractor load bed is connected by some rigid connecting means such as a reach or by the load itself to the movable load bed 24 of the trailer 20. As the tractor turns the reach will also turn the trailer load bed 24 on the trailer 20 and, through the linkage connection, e.g., the cables 26, move the steering axle assembly 23 a predetermined amount relative to the trailer frame 21. With the lengths on the linkage lever arms adjusted properly to provide the correct amount of axle turning relative to the amount of rotation of the shaft 25, the trailer 20 will then be automatically steered directly in the path of the tractor during the turn.

Describing now the invention in greater detail, and in particular the embodiment of FIGS. 1 to 11, the main frame 21 of the trailer 20 is composed of two parallel longitudinal frame members 30 and 31 connected by cross bracing members 32. The fixed rear axle assembly 22 at one end of the frame 21 comprises an axle 33 equipped with wheels 34 and attached at each opposite end by U-bolts 35 to a curved leaf spring 36. Each of the leaf springs 36 is attached at both of its ends 37 in the well known manner to brackets 38 which are in turn fixed to the longitudinal frame members 30 and 31.

The movable axle assembly 31 which is mounted for rotation in a horizontal plane relative to the frame 21 comprises an axle 40 equipped with wheels 41 and attached near each end by a U-bolt 42 to a leaf spring 43. Each leaf spring 43 in turn is retained in the well known manner at its ends 44 by brackets 45. The brackets 45 are attached to a front axle frame 46 having side members 47 supported by two end cross members 48 and covered by a plate 49. To provide for an auxiliary towing connection on the trailer 20, when the trailer steering feature is not being used, a bifurcated bracket 59 is attached to the forward end of each side member 47 and connected by a pin 52 to an end 53 of a forked towing tongue 54.

To provide a rotary connection between the front axle assembly 23 and the trailer frame 21 in the embodiment of the invention of FIGS. 1–11, a large circular bearing plate member 55 is fixedly attached in a suitable manner to the plate 49 across the top of the front axle frame 46 as shown in detail in FIG. 5. Partially around its outer periphery the bearing plate member 55 has a groove 56 having a radius of curvature slightly larger than and adapted to receive the cables 26 and to spread them outwardly at a predetermined distance from the axis of rotation of the movable axle assembly 23. Fixed to the plate 49 on the front axle frame 46 and forward of the bearing plate member 55 are a pair of brackets 57. Each bracket 57, shown in detail in FIG. 3a, has an upright flange 58 and is bored with a hole 59 whose axis is aligned tangentially with the peripheral groove 56 on the bearing plate member 55. Inwardly from the groove 56 and extending above the upper surface of the bearing plate member 55 is a vertical, completely circular bearing ring flange 60, and extending inwardly therefrom is an integral horizontal flange member 61, also having a circular shape in plan form.

On the underside of the longitudinal frame members 30 and 31 of the main trailer frame 21 and at the forward end thereof is a fixed circular bearing ring member 63 having a diameter slightly less than the diameter of the circular bearing ring flange 60 in order to form a suitable clearance therewith. With the trailer 20 assembled, the bearing ring 63 fits within the bearing ring 60 and is supported by the horizontal circular flange member 61. A series of ball bearings 64 are seated in a circular pattern between the bearing ring 63 and the circular flange 61, and thus a smooth, relatively friction free movement is provided between the front axle assembly 23 and the trailer frame 21.

The rotatable trailer load bed 24 mounted between the fixed and movable axle assemblies 22 and 23 on the trailer frame 21 may be in the form of any well-known bolster or fifth wheel commonly used on trucks and trailers. However, the load bed 24 shown in the drawings is especially adapted to receive wide, heavy loads and comprises a frame 65 composed of a pair of channel members 66 connected by two outer supporting cross members 67 and four inner cross members 68. As shown in FIG. 4, a bearing bracket 69 is fixed to the lower flange of each inner cross member 68. Each bracket 69 has a hole 70, and these are axially aligned to receive a pin 71 which pivotally connects the load bed frame 65 to a rotatable bearing plate 72. The bearing plate 72 has a central circular opening 73 and a plurality of parallel triangular members 74 which are welded to the upper surface of the bearing plate 72 on opposite sides of the opening 73. The members 74 support a pair of sleeve members 75, each of which fits between a pair of brackets 69 and through which passes the pin 71 which thus connects the bearing plate 72 to the load bed frame 65. The pin 71 connection provides a pitching movement relative to the trailer frame 21 of the load and the load bed 24 about a horizontal transverse axis parallel to the axis of the fixed axle 33. This freedom of movement is essential to the load bed under certain road conditions.

To provide added strength to the trailer frame 21 below the load bed 24 I prefer to attach an additional channel section 76 on top of each of the longitudinal frame members 30 and 31 below the load bed 24. A fixed bearing plate member 77 having a central circular opening 78 is attached across the top of the channel members 76 and supports the rotating bearing plate 72 of the load bed 24, (FIG. 6).

The load bed 24 is rotatably connected to the frame 21 by means of the central shaft 25 mounted vertically in the frame 21, within a guiding sleeve member 80 attached at its upper end to the fixed bearing plate 77 (FIG. 6) and at its lower end by means of a bearing plate 79 fixed to a pair of cross frame support members 81 extending between the longitudinal members 30 and 31 (FIG. 4). The upper end of the shaft 25 is welded to a rectangular plate 82 and extends from the sleeve 80 through the circular openings 73 and 78, in the fixed and movable bearing plates 72 and 77 respectively. Both of the openings 73 and 78 are considerably larger in diameter than the shaft 25. Despite side forces on the load bed 24, the shaft 25 is kept centrally located within the openings and away from the edges thereof by means of the flat rectangular plate 82 which is retained along its sides and ends by stop members 83 and 84 on the upper surfaces of the movable bearing plate 72. Thus, the shaft 25 will never bind against the opening 78 in the mounting plate 77 and any bending forces on the shaft 25 will be absorbed by the stops 83 and 84.

The lower end of the shaft 25 is connected to an adjustable lever arm assembly 85, the details of which are shown in FIGS. 7–11. The lever arm assembly 85 comprises two lever arm members 86 and 87 which are joined together in a parallel relationship and held apart at a predetermined distance by a circular collar 88. The collar 88, located mid-way between the two arm members 86 and 87 and welded thereto, has a central circular opening 89 to receive the shaft 25 with two keyways 90 located on the opposite sides thereof. The shaft 25 passes through the opening 89 in the collar 88 and is retained below the lower lever arm 87 by a circular end plate 91 retained on the end of the shaft 25 by a screw 92. Torsional slippage between the shaft 25 and the collar 88 is prevented by a pair of keys 93 which fit in the keyways 90 of the collar 88 and in mating keyways 94 of the shaft 25.

Extending through each of the lever arms 86 and 87 on each side of the collar 88 are slots 95 and 96 of uniform width and length which are similarly located on each of the lever arms 86 and 87 and are therefore aligned one above the other. As shown in the plan views of FIGS. 9 and 10 the slots 95, 96 extend outwardly toward the sides of the trailer 20 while also extending slightly rearwardly thereof from the shaft 25. Slidably mounted within each slot 95, 96 is a cylindrical pin 97 to which is connected the end of a linkage cable 26. As shown in detail in FIG. 11, each cylindrical pin 97 is fixed at its upper end to a rectangular plate 98, preferably retained by a carriage bolt 99 and a lock washer 100. At its lower end each pin 97 is attached to a similar lower rectangular plate 101 which in turn is fixed to a threaded collar 102, such a standard hexnut. On the upper surface of the upper lever arm 87 and parallel to each slot 95 is fixed a guide bar 103 which is engaged by the rectangular plate 98 as it moves in and out toward the shaft 25 during adjustment of the pins 97 along the slots 95. The guide bar 103 absorbs the tension force of the cables 26 so that there will be no binding of the pins 97 in the slots 95 and 96. Similarly, a guide bar 104 is provided on the lower surface of the lower lever arm 86 to engage the rectangular plates 101.

The moving force for the pins 97 within the slots 95 and 96 is provided by a driving screw 105 having left hand and right hand threaded portions 106 and 107 which are threaded through the collars 102. The screw 105, when turned by a crank 108 is maintained in a stationary position by means of a thrust collar 109 located between the threaded portions 106 and 107. The collar 109 rides between two retaining bars 110 attached to the underside of the lower lever arm 86 and as the crank 108 and the driving screw 105 are turned, the collars 102 are driven inwardly or outwardly towards or away from the shaft 25 to vary the moment arms on the cables 26.

This adjustable lever arm assembly 85 provides a means to adjust the amount of movement of the steering axle 23 in proportion to the amount of turning of the load bed 24. For different distances between the tractor 27 and the trailer 20 the turning ratio between the load 24 and the movable axle 23 must be adjusted so that the axle 23 will move just the right amount in response to movement of the load bed 24, to track directly behind the tractor 27. For example, if a longer load is to be hauled and the distance between the movable load beds on the tractor and trailer is to be increased, the crank 108 is turned to decrease the effective lever arm connected between cables 26 and the shaft 25. In other words, the pins 97 would be moved inwardly within the slots 95, 96 and toward the shaft 25.

As shown in the embodiment of FIGS. 1 to 11, the lever arms 86 and 87 on the shaft 25 are linked to the movable front axle assembly 23 by the steering cables 26. Each cable 26 has an eye shaped fitting 111 swaged to one of its ends and each fitting 111 fits, with ample clearance, around an adjustable pin 97 on the lever arms 86 and 87. Both cables 26 thus attached to the lever arms 86 and 87, extend forward therefrom and, while lying in the groove 56, extend partially around the periphery of the circular bearing member 55.

Figure 2:
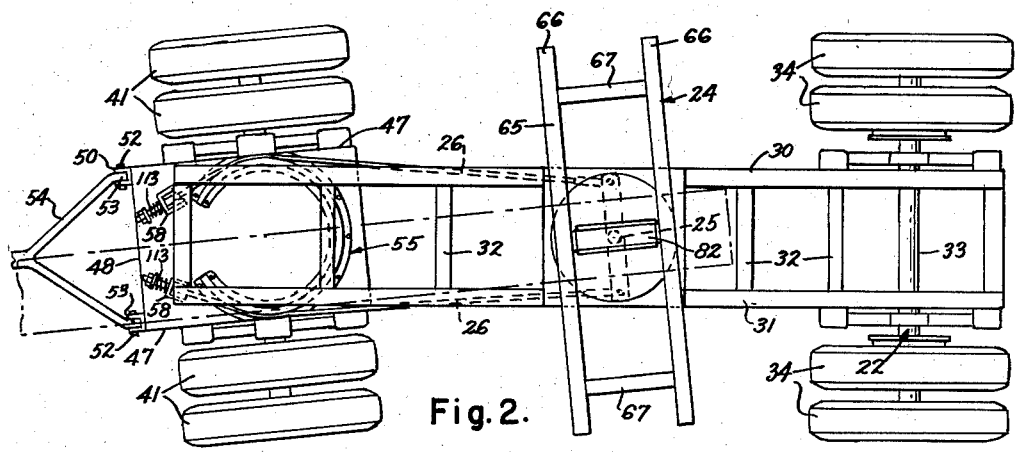
FIG. 2 is a top view of the trailer shown in FIG. 1 with the load bed and the wheels shown in a slight turning position.
Figure 3A:
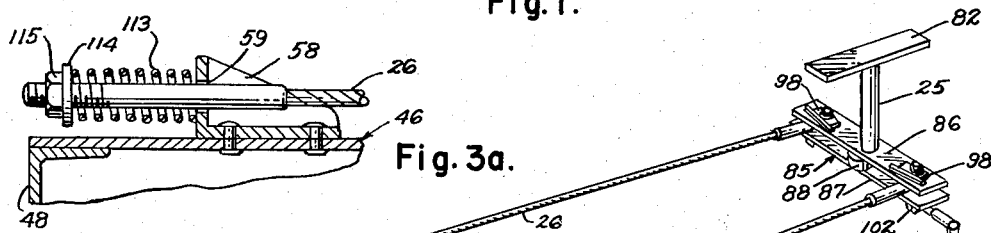
FIG. 3a is an enlarged fragmentary view in section showing the cable retaining bracket in detail.
Figure 3:
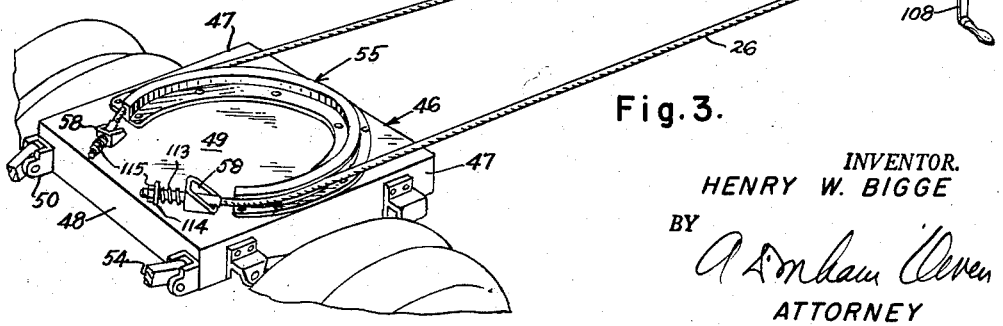
FIG. 3 is a fragmentary view in perspective showing the linkage connection between the load bed and front axle of the embodiment of FIG. 1, the remaining members of the trailer being shown in phantom.
Figure 9:
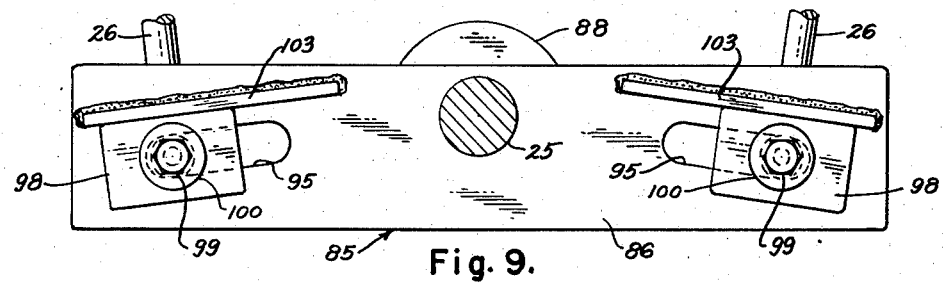
FIG. 9 is an enlarged top view of the adjustable lever arm assembly shown in FIG. 7.
Figure 10:
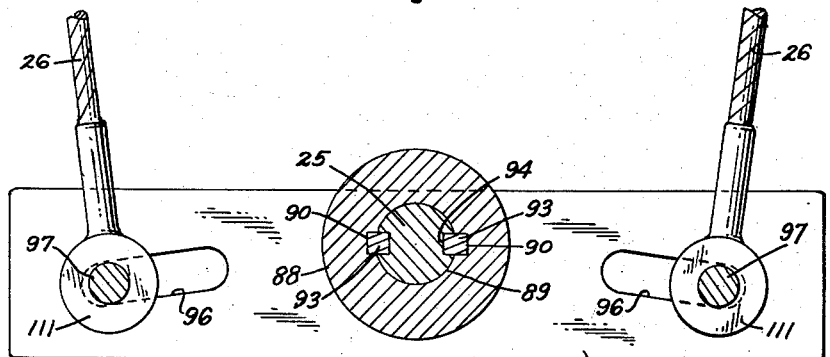
FIG. 10 is an enlarged plan view in section taken along line 10—10 of FIG. 7.
Figure 7:
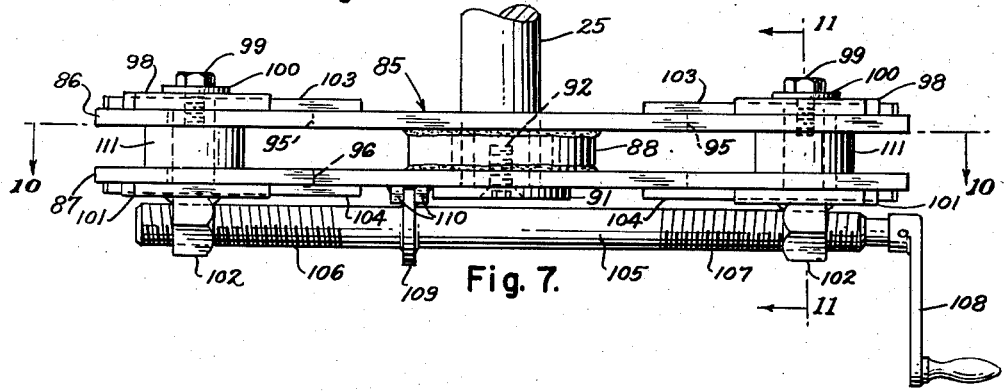
FIG. 7 is an enlarged view in elevation showing the adjustable lever arms on the main pivotal shaft.
Figure 8:
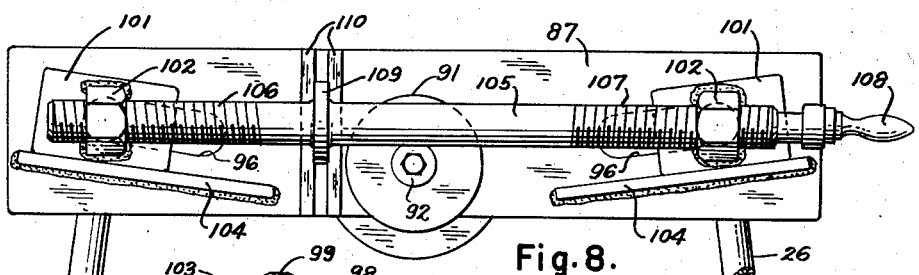
FIG. 8 is an enlarged view from underneath the adjustable lever arm assembly shown in FIG. 7.
Figure 11:
FIG. 11 is a view in side elevation and in section taken along line 11—11 of FIG. 7.

In order for the trailer to track directly behind the tractor according to principles of the invention, the amount of rotation of the movable load bed 24 on the trailer 20 will always be greater than the amount of rotation of the axle assembly 23 for any turning maneuver (see FIG. 2). Thus the length of the lever arms 86, 87 attached to the shaft 25 will always be less than the diameter of the groove 56 on the cable bearing member 55. Therefore, as mentioned previously, the slots 95 and 96 extend rearwardly somewhat on the lever arms 86, 87 so that the cables 26 will extend therefrom at an angle of 90°. Thus, any movement of the shaft 25 will give maximum travel to the cables 26, and this affords the most responsive linkage system. The end of each cable 26 is connected to the movable axle assembly 23, by means of a swaged threaded end fitting 112 which as shown in FIG. 3a extends through the flange 58 of the bracket 57, a coil spring member 113, a washer 114, and is then threaded to a take-up or retaining nut 115. The nut 115 and washer 114 serve to retain the spring 113 against the flange 58 which thus provides a shock absorbing feature for each cable 26 between the shaft 25 and the front axle assembly 23 during any turning maneuver. A sudden limited movement of the load bed 24 will cause deflection of the springs 113 rather than movement of the axle assembly 23, and this feature provides for smooth tracking of the trailer even over rough roads. The take-up nuts 115 can also be threaded on the end fitting 112 of each cable 26 to adjust the length of each cable link 26 so that the front axle assembly 23 and the wheels 41 will maintain their proper alignment and position relative to the position of the load bed 24.

An alternative embodiment of my invention is shown in FIGS. 12 to 14. In this form of the invention, a vertical load bed shaft 120 is mounted on the trailer 20a. At its upper end the shaft 120 may be connected by means of a rectangular plate 121 to any form of load bed device such as the load bed 24 described in the embodiment of FIGS. 1–11. The trailer details are shown only in phantom in FIG. 12 since they may be the same as those of the trailer 20 shown in FIGS. 1 and 2. At the lower end of the shaft 120 is fixed a collar 122 to which is attached a sleeve 123 which may have a rectangular cross section. Retained within the sleeve 123 with an easy sliding clearance is an adjustable lever bar 124 the outer end of which is bored and connected by means of a hinge pin 125 to a linkage connecting rod 126 that extends forward. An indicating pointer 127 fixed to the upper surface of the sleeve 123 extends parallel to the end 128 of the lever bar 124 opposite the pin connected end. The pointer 127 has a bent over end portion 129 extending adjacent the lever bar 124 and adjacent a series of graduated markings 130 to indicate the length of the lever arm 124 extending outwardly from the center line of the shaft 120. The connecting rod 126 is connected by a pin 131 at its forward end to a lever arm 132 which may be attached to the frame 133 of the front axle assembly 134 or which, as shown in FIG. 12, may extend directly from a shaft 135 forming the axis of rotation of the front axle assembly 134 relative to the trailer frame 136. In FIG. 12 the shaft 135 is shown connected to the front axle frame 133 by means of a plate 137 attached to the shaft 135. The amount of rotation of the front axle assembly 134 due to rotation of the load bed shaft 120 can be regulated with the embodiment of the invention shown in FIGS. 12–14 by loosening the set screw 138 and moving the lever bar 124 relative to the shaft 120 within the sleeve 123. Reference is made to the graduated markings 130 to adjust the lever bar 124 to the proper length for variations in connecting distances between the trailer and a tractor.

The trailer steering mechanism of the present invention may be used on a load carrying trailer such as the trailer 20 and connected to a tractor vehicle merely by the load itself. In such an arrangement (not shown) the load, generally an unusually long load such as poles or pipes, is mounted with its front end fixed to the bolster of the tractor and its rear end fixed to a bolster or the load bed 24 of the steerable trailer 20.

However, in some instances, it may be desirable to have a connecting means in combination with the steerable trailer which can be extended and attached to the tractor vehicle to provide a more secure connecting link and to facilitate the use of the trailer with its steerable feature even while in the unloaded condition.

Briefly summarizing now, the operation of my novel trailer steering device, a load is attached to the movable load bed 28 on a tractor vehicle 27 and to the movable load bed 24 of the trailer 20. The load may be secured directly on the load beds 24 and 28. The lever arm assembly 85 on the load bed shaft 25 is adjusted for the particular load length or reach extension by means of the crank 108 which moves the pins 97 on the lever arms 86, 87 towards or away from the shaft 25. This varies the length of the moment arm on the cables 26 and thus the amount of movement of the front axle assembly 23 resulting from a movement of the trailer load bed 24. Since the amount of turning of the front axle 23 to make the trailer 20 track behind the tractor is dependent on the distance between the load beds of the tractor and trailer, the adjustment of the pins 97 on the lever arms 86, 87 is essential to optimum operating results. The adjustment is made quickly and positively without the need for tools and time consuming linkage adjustment procedures.

As the tractor 27 commences to turn, the load, or a fixed reach pivots at each end relative to the tractor bolster and the trailer load bed 24, causing the shaft 25 and the lever arm assembly 85 on the trailer 20 to rotate, and causing the cables 26 in turn to rotate the front axle assembly 23 the prescribed proportional amount of travel to steer the trailer in the proper track behind the tractor.

From the foregoing it is apparent that the present invention provides an efficient, yet relatively simplified trailer steering mechanism that has important advantages and that solves serious problems relating to the trailer steering problem and the hauling of long, heavy loads. My invention may be adapted to any standard trailer configuration with only minor modifications to provide automatic trailer steering that is highly accurate and dependable.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An automatic steering device for a trailer type vehicle having a frame, an axle assembly mounted for rotation on one end of said frame, means carried by said frame for supporting the other end of said frame, and a load carrying means rotatably mounted on said frame, said steering device comprising: a rotatable shaft, mounted on said frame in a vertical position parallel to the axes of rotation of both said axle assembly and said load carrying means; means for connecting the upper end of said shaft to said load bed; a lever means attached to the lower end of said shaft, said lever means comprising a pair of arms extending outwardly from opposite sides of said shaft and substantially transverse to the longitudinal axis of said trailer frame, and slot means extending along a portion of each said arm; pin means retained in and movable along said slot means in each said arm; shaft means threaded to said pin means for simultaneously moving both of said pin means along said slots; a cable linkage means attached at one end to each of said pin means on each of said arms, each said cable means being attached at its other end to said axle assembly, and being operatively connected therewith to provide steering forces at a predetermined distance from the axis of rotation of said axle assembly.

2. An automatic steering device for a trailer type vehicle having a frame, an axle assembly mounted for rotation on one end end of said frame, means carried by said frame for supporting the other end of said frame, and the load carrying means rotatably mounted on said frame, said steering device comprising: a rotatable shaft mounted on said frame in a vertical position parallel to the axes of rotation of both said axle assembly and said load carrying means; means for connecting the upper end of said shaft to said load bed; a lever means attached to the lower end of said shaft, said lever means comprising a pair of arms extending outwardly from opposite sides of said shaft and substantially transverse the longitudinal axis of said trailer plane; linkage connecting means retained in and movable along each said arm; means for simultaneously moving both of said connecting means along said arm; a cable linkage means attached at one end to each of said cable means, on each of said arms; said axle assembly comprising a bearing plate having an outer grooved portion and an inner bearing ring; bearing ring attached to said trailer frame being slightly smaller than and adapted to ride within said inner bearing ring to provide the rotation of said axle assembly relative to said frame; bracket means on said axle assembly aligned with said grooved portion on said bearing plate; each said cable means being attached at one end to said connecting means on said lever arm and attached at its other end to said bracket means on said axle assembly while engaged with said groove portion on said bearing plate; said cable means being thus operatively connected with said axle assembly to provide steering forces effective at a predetermined lever arm distance from the axis of rotation of said axle assembly.

3. The device as described in claim 2 including shock absorbing means on the end of each cable attached to said axle assembly to prevent the transmission of small abrupt movements of the trailer load bed to the steering axle assembly of the trailer.

4. The device as described in claim 3 wherein said shock absorbing means comprises an end fitting at the end of each cable and a spring means at each cable end, each said cable end extending through a said bracket with said spring means being retained by said fitting against said bracket.

5. An automatic steering device for a trailer type vehicle having a frame, an axle assembly mounted for rotation on one end of said frame, means carried by said frame for support on the other end of said frame, and a load carrying means rotatably mounted on said frame, said steering device comprising: a rotatable shaft mounted on said frame in a vertical position parallel to the axes of rotation of both said axle assembly and said load carrying means; means for connecting the upper end of said shaft to said load bed; a sleeve member fixed to the lower end of said shaft, said sleeve member having a central opening with an axis substantially perpendicular to the longitudinal center line of the frame of said trailer vehicle; a lever bar slidably mounted within said opening of said sleeve and extending completely therethrough with an outer end and an inner end on opposite sides of the longitudinal center line of said trailer; means on said sleeve to retain said lever bar at a fixed, predetermined position relative to said sleeve; a connecting rod pivotally connected to said lever bar near its said outer end, said connecting rod being pivotally connected to said axle assembly at a predetermined distance from the axis of rotation thereof.

6. The device as described in claim 5 including an indicating pointer attached to said sleeve and extending substantially parallel said level bar towards its inner end; and graduated markings on said lever bar to indicate the amount of extension of said outer end of said lever bar away from said sleeve.

References Cited in the file of this patent

UNITED STATES PATENTS

| | | |
|---|---|---|
| 2,197,401 | Weber | Apr. 16, 1940 |
| 2,750,208 | Henry | June 12, 1956 |
| 2,794,655 | Charette | June 4, 1957 |
| 2,797,106 | Lorr | June 25, 1957 |
| 2,818,272 | De Lay | Dec. 31, 1957 |

FOREIGN PATENTS

| | | |
|---|---|---|
| 389,166 | Great Britain | Mar. 16, 1933 |
| 459,494 | France | Sept. 6, 1913 |
| 543,362 | France | June 1, 1922 |
| 923,827 | Germany | Feb. 21, 1955 |
| 925,332 | Germany | Mar. 17, 1955 |